(12) United States Patent
Mohammed et al.

(10) Patent No.: US 8,010,106 B2
(45) Date of Patent: *Aug. 30, 2011

(54) LISTEN MODE FOR WIRELESS DEVICES

(75) Inventors: Jahangir Mohammed, Santa Clara, CA (US); Daniel G. Collins, Cork (IE); Amit Gupta, Livermore, CA (US)

(73) Assignee: jasper wireless, inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/819,375

(22) Filed: Jun. 21, 2010

(65) Prior Publication Data

US 2010/0255842 A1 Oct. 7, 2010

Related U.S. Application Data

(63) Continuation of application No. 11/506,398, filed on Aug. 17, 2006, now Pat. No. 7,769,381.

(60) Provisional application No. 60/814,966, filed on Jun. 20, 2006.

(51) Int. Cl.
*H04W 4/00* (2009.01)

(52) U.S. Cl. ...................................... 455/435.2; 455/434

(58) Field of Classification Search ............... 455/435.2, 455/432.1, 426.1, 432.3, 433, 434, 435.1, 455/450, 453, 574, 436–444, 456.1, 456.4, 455/448; 370/331, 338
See application file for complete search history.

(56) References Cited

U.S. PATENT DOCUMENTS

| | | | | |
|---|---|---|---|---|
| 5,687,217 | A * | 11/1997 | Bliss et al. | 455/423 |
| 6,223,037 | B1 * | 4/2001 | Parkkila | 455/434 |
| 6,377,803 | B1 * | 4/2002 | Ruohonen | 455/434 |
| 6,434,389 | B1 * | 8/2002 | Meskanen et al. | 455/437 |
| 6,510,146 | B1 * | 1/2003 | Korpela et al. | 370/332 |
| 6,771,960 | B1 * | 8/2004 | Otting et al. | 455/434 |
| 6,978,138 | B2 * | 12/2005 | Japenga et al. | 455/436 |
| 7,184,768 | B2 * | 2/2007 | Hind et al. | 455/435.3 |
| 7,200,384 | B1 * | 4/2007 | Tervo et al. | 455/414.1 |
| 7,321,749 | B2 * | 1/2008 | Rick et al. | 455/67.11 |
| 7,369,859 | B2 * | 5/2008 | Gallagher | 455/456.1 |
| 7,551,934 | B2 * | 6/2009 | Friman et al. | 455/466 |
| 7,596,378 | B1 * | 9/2009 | Nizri et al. | 455/448 |
| 7,769,381 | B2 * | 8/2010 | Mohammed et al. | 455/435.2 |
| 2003/0060201 | A1 * | 3/2003 | Soliman | 455/442 |
| 2003/0125073 | A1 * | 7/2003 | Tsai et al. | 455/552 |
| 2003/0224790 | A1 * | 12/2003 | Choi | 455/435.3 |
| 2004/0192305 | A1 * | 9/2004 | Namiki et al. | 455/435.1 |
| 2005/0250529 | A1 * | 11/2005 | Funnell et al. | 455/525 |
| 2006/0084443 | A1 * | 4/2006 | Yeo et al. | 455/449 |
| 2006/0111110 | A1 * | 5/2006 | Schwarz et al. | 455/439 |
| 2006/0194577 | A1 * | 8/2006 | Su | 455/435.2 |
| 2008/0031368 | A1 * | 2/2008 | Lindoff et al. | 375/260 |

* cited by examiner

*Primary Examiner* — Brandon J Miller
(74) *Attorney, Agent, or Firm* — Van Pelt, Yi & James LLP

(57) ABSTRACT

Camping on a cell of a wireless network is disclosed. One or more available cells are determined for a wireless device. One or more available networks are determined based at least in part on the one or more available cells. A network is selected based at least in part on one or more network selection criteria. A cell of the selected network is selected. The selected cell is camped on, wherein camping enables receiving control channel information from the cell of the selected network. In the event that a registration condition is satisfied, the wireless device is registered on the selected network using control channel information.

28 Claims, 2 Drawing Sheets

LISTEN MODE FOR WIRELESS DEVICES

CROSS REFERENCE TO OTHER APPLICATIONS

This application is a continuation of co-pending U.S. patent application Ser. No. 11/506,398, entitled LISTEN MODE FOR WIRELESS DEVICES filed Aug. 17, 2006 which is incorporated herein by reference for all purposes, which claims priority to U.S. Provisional Application No. 60/814,966, entitled STANDBY MODE FOR WIRELESS DEVICES filed Jun. 20, 2006 which is incorporated herein by reference for all purposes.

BACKGROUND OF THE INVENTION

Wireless devices today operate in one of three radio modes—TRAFFIC, STANDBY, or OFF. In both TRAFFIC and STANDBY modes, the device periodically sends control information to and receives control information from other wireless transmitters (usually fixed towers and/or other wireless devices) independent of any user data transmission. In the OFF mode, the device is separated from the network, and it does not send or receive any information (whether for control or for data purposes). Devices change to the OFF mode for multiple reasons—two typical reasons being to conserve power and to avoid sending RF signals in restricted environments like hospitals and airplanes. However, it takes considerable time to reconnect with the network and communicate data messages when the device switches from the OFF mode to the TRAFFIC mode. When the device remains powered on and not in TRAFFIC mode, it stays in STANDBY mode. In STANDBY mode, the device camps on a control channel, decodes system information and periodically transmits signals to the network announcing its whereabouts. However, transmitting periodic signals drains device power and uses resources of the network. It would be beneficial to conserve network resources and conserve power for the device without having the lengthy reconnect time from the OFF mode.

BRIEF DESCRIPTION OF THE DRAWINGS

Various embodiments of the invention are disclosed in the following detailed description and the accompanying drawings.

DETAILED DESCRIPTION

Figure 1:
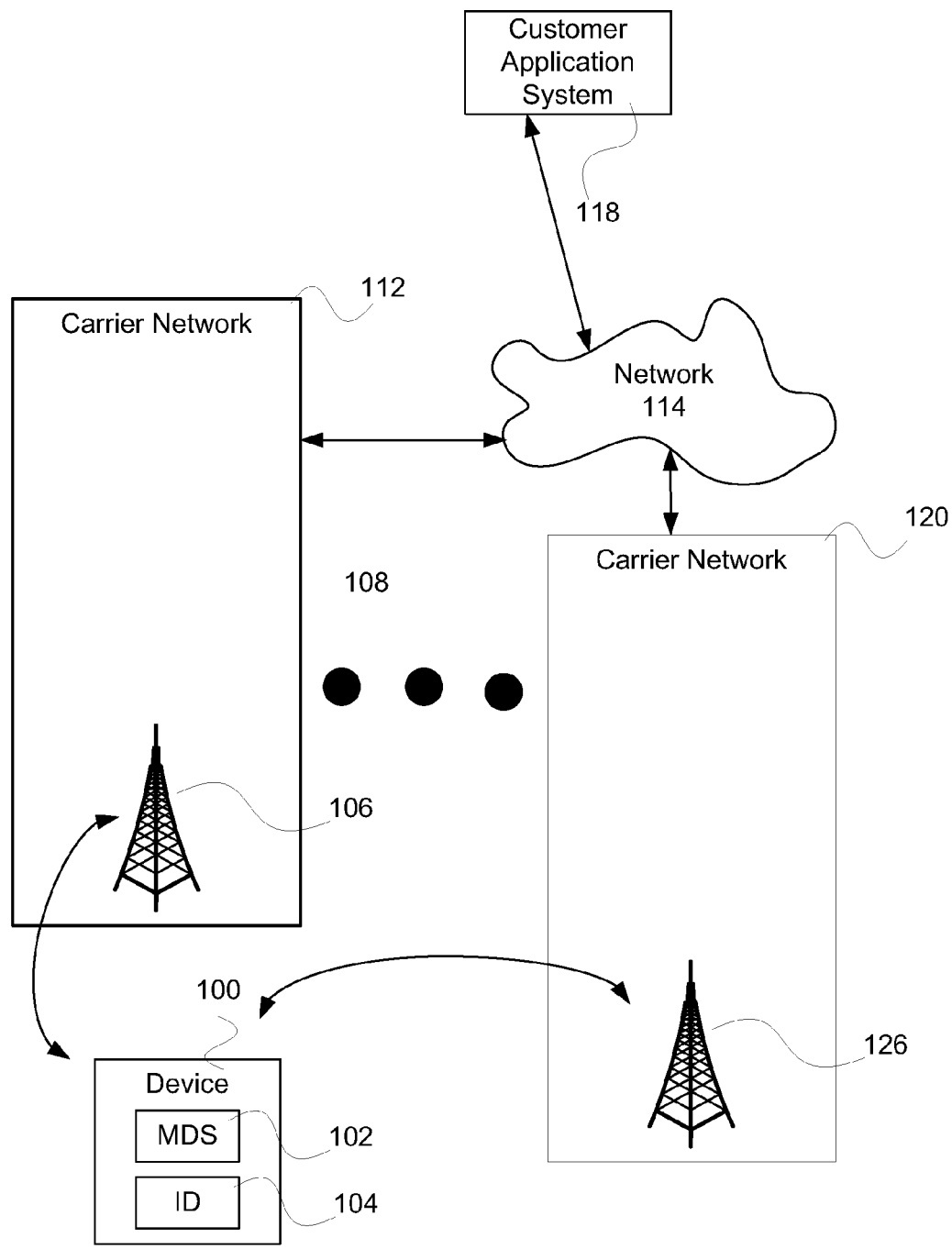
FIG. 1 illustrates a block diagram of an embodiment of a system for camping on a cell of a wireless network in a LISTEN mode.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A LISTEN mode is disclosed. In some embodiments, the LISTEN mode comprises camping on a cell of a wireless network until a registration condition is satisfied. One or more available cells are determined for a wireless device. One or more available networks are determined based at least in part on the one or more available cells. A network is selected based at least in part on one or more network selection criteria. A cell is selected of the selected network. The selected cell is camped on wherein camping enables receiving control channel information from the selected cell of the selected network. In the event that a registration condition is satisfied, the wireless device is registered on the selected network using control channel information.

In some embodiments, during the LISTEN mode the device listens for the wireless signals from the various transmitters, but does not transmit any signals out. In this state, the device remains camped on a control channel decoding system information and can keep track of the "Control channel(s)" in the surrounding radio environment. With this device mode, 1) the device can switch to TRAFFIC or STANDBY state a lot faster—resulting in much better customer experience; 2) the device can use some of the surrounding radio environment information to decide to switch to STANDBY mode and transmit data/receive information; 3) the device can switch to STANDBY or TRAFFIC mode a lot faster, when the user initiates an activity; 4) the device can store the information about the surrounding radio environment for other applications (for example, to report on the signal strength at various locations); 5) the device conserves power because transmitting signals as is done in STANDBY mode requires a lot more power as compared to just receiving signals as is done in LISTEN mode; 6) the device does not register or do location updates with the network—saving network resources, and hence cost, on its signaling channels in both wireless and wired infrastructure; 7) the device is "anonymous"—others do not know about its existence and it does not need to authenticate itself in the LISTEN mode.

In various embodiments, the registration condition comprises having data to send, having not registered for a predetermined period of time (e.g., 2 days), a user indication to register, one or more user actions, or any other appropriate registration condition. In some embodiments, a previous network selection is used to help determine the current network selected. In various embodiments, the wireless network comprises a cell phone network, a WiFi™ network, a WiMax™ network, a CDMA network, a GSM network, a GPRS network, a TDMA network, or any other appropriate wireless network.

In some embodiments, LISTEN mode keeps track of the Control Channel and enumerates all information elements—including signal strength (e.g., signal strength from one or more available cells), nearby cells, neighboring cell identifiers, network identifiers, location area identifiers, cell identifiers, location information, etc.

In some embodiments, control channel information from the camped on cell is stored and the stored information includes signal strength from one or more of the available cells and location information. In some embodiments, the location information is derived from GPS derived location information.

In some embodiments, Control Channel information elements are used to trigger other events on device or to perform predetermined operations on the device, including communicating with the wireless network and/or third-party devices and servers—for example, the time is after a predetermined time (i.e., a rental car should be returned on a certain day; the device is triggered to send a message on that day indicating the location of the car) or the wireless device is located in a predetermined prohibited geographic area (i.e., a rental car should only be driven in the USA and not Mexico; the device is triggered to send a message when it enters Mexico as identified by a Mexican cell tower).

In some embodiments, Control Channel information elements are stored for signal-strength reporting/location-tracking and other purposes (e.g., a rental car should only be driven in the USA not Mexico, the device stores cell tower identification information so that on return of the car the rental agency can determine if the car was driven near a Mexican cell and hence beyond the parameters of the rental contract).

In some embodiments, mapping between "radio world" and GPS information is stored, if available, and this mapping is used for getting approximate GPS information for other devices when they do not get GPS signals.

In some embodiments, a cellular device that is simply in a STANDBY mode all the time without user doing any voice or data transactions still represent cost for the carrier. This is because in the standby mode the device still sends occasional signaling messages to the base station, which costs money. In the LISTEN mode, however, the device does not send any signaling messages to the base station, yet it is able to conduct a transaction for the user without too much latency when asked to do so. This is achieved by the device passively listening so that it is aware of the closest base station and the system information, but not transmitting any messages.

In some embodiments, camping is for an extended period of time where the network is not aware of the device, but the device is all but registered on the selected network. In this case, control channel information is stored and refreshed in preparation for registering on a selected network. One or more available cells are determined for a wireless device. One or more available networks are determined based at least in part on the one or more available cells. A network is selected based at least in part on one or more network selection criteria. A cell is selected of the selected network. The selected cell is camped on wherein camping enables receiving control channel information from the selected cell of the selected network. Control channel information is stored. Stored control channel information is refreshed from the selected cell of the selected network.

In some embodiments, camping is for an extended period of time where the network is not aware of the device, but the device is all but registered on the selected network. In this case, the device can move to a neighboring cell of a selected network and continue to camp. Control channel information is stored and refreshed in preparation for registering on a selected network. One or more available cells are determined for a wireless device. One or more available networks are determined based at least in part on the one or more available cells. A network is selected based at least in part on one or more network selection criteria. A cell is selected of the selected network. The selected cell is camped on wherein camping enables receiving control channel information from the selected cell of the selected network. Control channel information is stored. A neighboring cell of the selected cell of the selected network is selected. The neighboring cell is camped on, wherein camping enables receiving control channel information.

FIG. 1 illustrates a block diagram of an embodiment of a system for camping on a cell of a wireless network in a LISTEN mode. In the example shown, device 100 comprises a mobile device that communicates data. Device 100 includes a mobile data service (MDS) 102—for example, general packet radio service—and an identifier (ID) 104—for example, a subscriber identifier module. Data can be transmitted and received by device 100 using MDS 102. Device 100 is identified using ID 104 and associated with a user or customer. Transmissions and receptions of data communicate with carrier network 112, which is associated with MDS 102. In various embodiments, the carrier network associated with MDS 102 comprises a mobile carrier network, a cell phone network, a messaging network, wireless communication network, a WiFi™ network, a WiMax™ network, a CDMA network, a GSM network, a GPRS network, a TDMA network, or any other appropriate network for communicating data to a mobile device.

A plurality of carrier networks, represented in FIG. 1 by carrier network 112 and 120, each include a plurality of cell towers—represented in FIG. 1 by tower 106 and 126. Communications of data traffic to and from device 100 are received by carrier network 112 via a cell tower or by carrier network 120 via a cell tower, which can communicate the data traffic with network 114 and a customer application system 116.

In some embodiments, device 100 moves into range of one or more of the plurality of carrier networks/plurality of cell towers and remains in LISTEN mode until a registration condition has been satisfied. LISTEN mode enables device 100 to conserve its own power and not tax carrier network resources until they are required for a communication.

In some embodiments, network 114 comprises the internet, a local area network, a wide area network, a wired network, a wireless network, or any other appropriate network for communicating with customer system 116. Customer application system 116 receives data from and transmits data to device 100 regarding the customer's services or products. In various embodiments, the customer's services includes transaction related services, monitoring services, and/or location tracking services.

Figure 2:
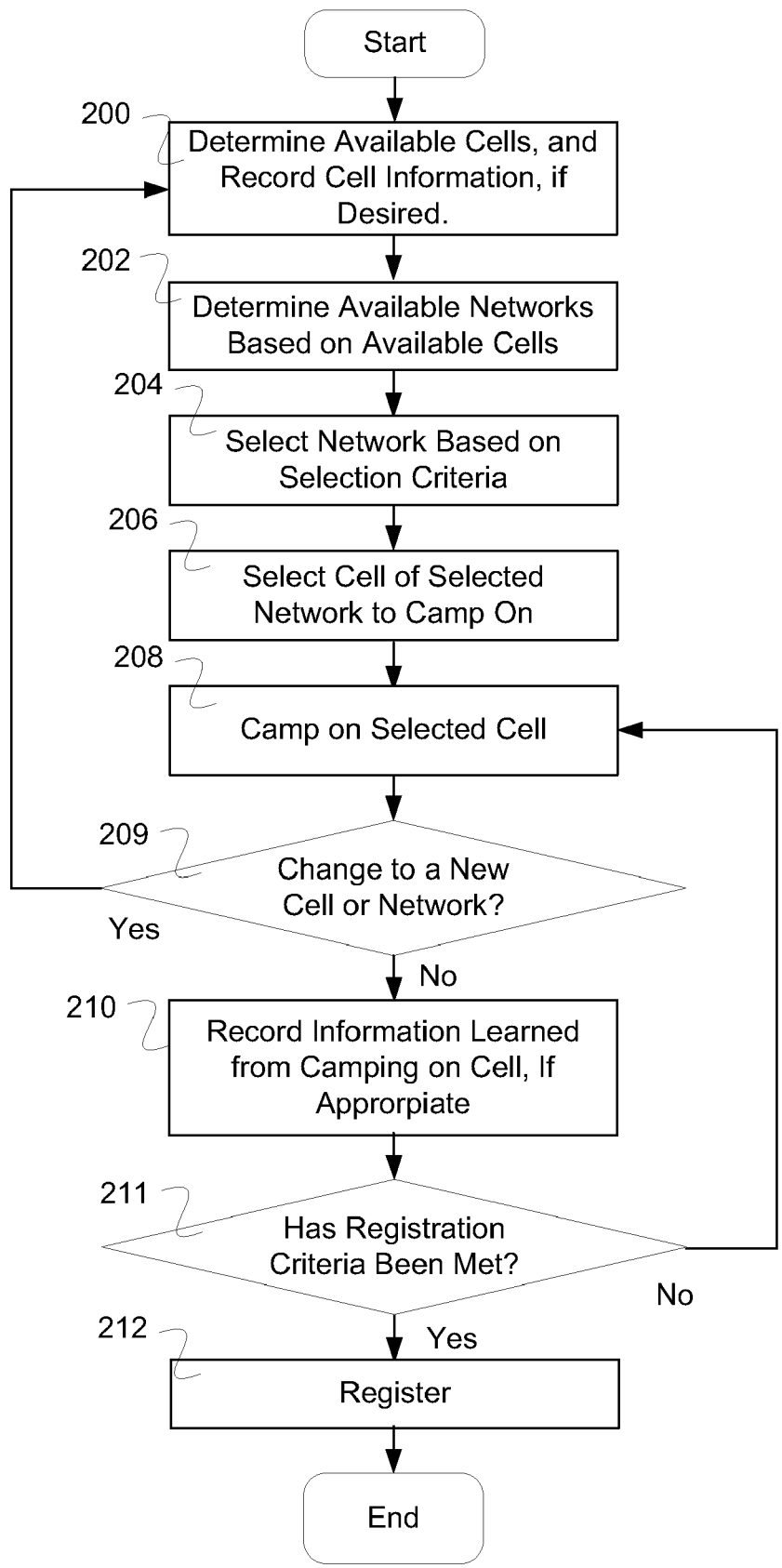
FIG. 2 is a flow diagram illustrating an embodiment of a process for camping on a cell of a wireless network in a LISTEN mode.

FIG. 2 is a flow diagram illustrating an embodiment of a process for camping on a cell of a wireless network in a LISTEN mode. In some embodiments, the process of FIG. 2 is executed on device 100 of FIG. 1. In the example shown, in 200 the available cells are determined, and cell information is recorded, if desired. In some embodiments, the cell information learned while determining available cells is recorded; the information determined includes local networks available, local signal strengths, local tower identifiers, etc. RF channels are searched to locate any cells that are broadcasting signals. If a signal is located, then the control channel information from the signal is added to an available cell list. In 202, the available networks are determined based on the available cells. The control channel information associated with the available cell can be used to determine the associated network of the cell. In 204 a network is selected based on selection criteria. In various embodiments, the selection criteria includes if the network is the prior network selected, if the network is on a predetermined list of acceptable networks, or any other appropriate selection criteria.

In 206, a cell of the selected network is selected. In 208, the selected cell of the selected network is camped on. In some cases, camping on a cell includes synchronizing to the broadcast signal, decoding control channel information, monitoring quality parameters (e.g., signal levels) to ensure that minimums are met, or any other appropriate camping processes. In various embodiments, control channel information is stored, refreshed from received control channel information, updated from control channel information received from a neighboring or new cell of a network, or any other appropriate manner of tracking control information useful for registering on a wireless network.

In 209, it is determined if a change to a new network or cell is desired. If a change is desired, then control passes to 200. If a change is not desired, in 210, information learned from camping on the cell is recorded, if appropriate.

In 211, it is determined if registration criteria have been met. If the registration criteria have not been met, then control passes to 208. If the registration criteria have been met, then registration is performed in 212. In some embodiments, control channel information is used to help register. Registration enables the device to communicate with the wireless network and with servers (e.g., a customer application server) in communication with the wireless network.

In some embodiments, camping occurs for an extended period of time so that control channel information used during registration is updated based on control channel information received from camping. In various embodiments, control channel information is received from the same cell, form a neighboring cell, or from a new cell. In various embodiments, no registration occurs after having selected a cell, after having selected a network, after having begun to camp on a cell, after selecting a different cell from an originally selected cell, or after selecting a different network from an originally selected network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for camping on a cell of a wireless network comprising:
   a processor; and
   a memory coupled with the processor, wherein the memory is configured to provide the processor with instructions which when executed cause the processor to:
   determine one or more available cells for a wireless device;
   determine one or more available networks based on the one or more available cells;
   select a network based on one or more network selection criteria;
   select a cell of the selected network;
   camp on the selected cell, wherein camping comprises receiving control channel information from the cell of the selected network and the wireless device being anonymous to the selected network;
   store the control channel information; and
   refresh the stored control channel information from the cell of the selected network in preparation for registering on the selected network.

2. A system as in claim 1, wherein camping on the selected cell and waiting for a registration condition to be satisfied comprises a LISTEN mode.

3. A system as in claim 2, wherein the registration condition comprises having to send data from the wireless device.

4. A system as in claim 2, wherein the registration condition comprises having not registered for a predetermined period of time.

5. A system as in claim 2, wherein the registration condition comprises one or more user actions.

6. A system as in claim 1, wherein the wireless network comprises a cell phone network.

7. A system as in claim 1, wherein the wireless network comprises a WiFi network.

8. A system as in claim 1, wherein the wireless network comprises a WiMax network.

9. A system as in claim 1, wherein the wireless network comprises a CDMA network.

10. A system as in claim 1, wherein the wireless network comprises a GSM network.

11. A system as in claim 1, wherein the wireless network comprises a GPRS network.

12. A system as in claim 1, wherein the wireless network comprises a TDMA network.

13. A system as in claim 1, further comprising storing information determined from available cells for the wireless device.

14. A system as in claim 13, wherein the stored information comprises signal strength from available cells.

15. A system as in claim 13, wherein the stored information comprises signal strength from one or more of the available cells and location information.

16. A system as in claim 15, wherein such location information is derived from GPS location.

17. A system as in claim 13, wherein the stored information is used to provide approximate location information for other devices.

18. A system as in claim 13, wherein the stored information comprises cell identifiers.

19. A system as in claim 13, wherein the stored information comprises neighboring cell identifiers.

20. A system as in claim 13, wherein the stored information comprises network identifiers.

21. A system as in claim 13, wherein the stored information comprises location area identifiers.

22. A system as in claim 1, wherein the processor is further configured to perform a predetermined operation in the event that information determined from available cells for the wireless device meets one or more triggering criteria.

23. A system as in claim 22, wherein the triggering criteria comprise that the determined information from available cells indicates that the wireless device is located in a predetermined prohibited geographic area.

24. A system as in claim 22, wherein the triggering criteria comprises that the determined information from available cells indicates that the time is after a predetermined time.

25. A system for camping on a cell of a wireless network comprising:
   a processor; and
   a memory coupled with the processor, wherein the memory is configured to provide the processor with instructions which when executed cause the processor to:
   determine one or more available cells for a wireless device;
   determine one or more available networks based at least in part on the one or more available cells;
   select a network based at least in part on one or more network selection criteria;

select a cell of the selected network;
camp on the selected cell, wherein camping comprises
   receiving control channel information from the cell of the selected network and the wireless device being anonymous to the selected network;
store the control channel information;
select a neighboring cell of the selected cell of the selected network; and
camp on the neighboring cell, wherein camping on the neighboring cell comprises
receiving control channel information from the neighboring cell of the selected network and the wireless device being anonymous to the selected network.

26. A system as in claim 25, wherein camping on the selected cell and waiting for a registration condition to be satisfied comprises a LISTEN mode.

27. A method for camping on a cell of a wireless network comprising:
   determining, using a processor, one or more available cells for a wireless device;
   determining one or more available networks based on the one or more available cells;
   selecting a network based on one or more network selection criteria;
   selecting a cell of the selected network;
   camping on the selected cell, wherein camping comprises
      receiving control channel information from the cell of the selected network and the wireless device being anonymous to the selected network;
   storing the control channel information in a memory; and
   refreshing the stored control channel information from the cell of the selected network in preparation for registering on the selected network.

28. A method for camping on a cell of a wireless network comprising:
   determining, using a processor, one or more available cells for a wireless device;
   determining one or more available networks based at least in part on the one or more available cells;
   selecting a network based at least in part on one or more network selection criteria;
   selecting a cell of the selected network;
   camping on the selected cell, wherein camping comprises
      receiving control channel information from the cell of the selected network and the wireless device being anonymous to the selected network;
   storing the control channel information in a memory;
   selecting a neighboring cell of the selected cell of the selected network; and
   camping on the neighboring cell, wherein camping on the neighboring cell comprises
   receiving control channel information from the neighboring cell of the selected network and the wireless device being anonymous to the selected network.

* * * * *